United States Patent [19]

Kohlmann et al.

[11] Patent Number: 5,138,610

[45] Date of Patent: Aug. 11, 1992

[54] METHOD OF CONTROLLING IN A QUASI-PARALLEL MODE A PLURALITY OF PERIHERAL UNITS FROM A SINGLE CONTROL UNIT AND A SYSTEM FOR IMPLEMENTING THIS MODE

[75] Inventors: Reinardus H. M. Kohlmann; Johannes A. A. Vossen, both of Eindhoven, Netherlands

[73] Assignee: U.S. Philips Corporation, New York, N.Y.

[21] Appl. No.: 668,375

[22] Filed: Mar. 11, 1991

Related U.S. Application Data

[63] Continuation of Ser. No. 324,379, Mar. 16, 1989, abandoned.

[30] Foreign Application Priority Data

Mar. 21, 1988 [NL] Netherlands ............... 8800698

[51] Int. Cl.⁵ .................. H04J 3/16; H04Q 11/04
[52] U.S. Cl. .................. 370/58.2; 370/85.1; 370/85.7
[58] Field of Search ............... 370/58.1–58.3, 370/67, 82, 85.1, 85.2, 85.7, 85.8, 105.1, 110.1; 364/200 MS File, 900 MS File

[56] References Cited

U.S. PATENT DOCUMENTS

| | | | |
|---|---|---|---|
| 3,377,621 | 4/1968 | Hittel et al. | 364/200 |
| 3,931,613 | 1/1976 | Grunner et al. | 364/200 |
| 4,032,721 | 6/1977 | Anizan | 379/284 |
| 4,109,311 | 8/1978 | Blum et al. | 364/200 |
| 4,396,980 | 8/1983 | Hingarh | 364/200 |
| 4,402,046 | 8/1983 | Cox et al. | 364/200 |
| 4,672,606 | 6/1987 | Bourgonje et al. | 370/85 |
| 4,672,608 | 6/1987 | Ball et al. | 370/85 |
| 4,688,212 | 8/1987 | MacGinitie et al. | 370/85 |
| 4,821,263 | 4/1989 | Lundh | 370/85 |

FOREIGN PATENT DOCUMENTS

| | | | |
|---|---|---|---|
| 0228629 | 7/1987 | European Pat. Off. | 370/105 |
| 0195659 | 10/1985 | Japan | 370/85 |
| 2162722 | 2/1986 | United Kingdom | 370/85 |

*Primary Examiner*—Benedict V. Safourek
*Assistant Examiner*—Alpus H. Hsu
*Attorney, Agent, or Firm*—Anne E. Barschall

[57] ABSTRACT

A method of controlling a plurality of peripheral units from a single control unit, a program being stored in a memory of the control unit and the peripheral units being in a position to communicate with one another and with the control unit over a common bus in successive frames of a time-division multiplex system, each frame in the time-division multiplex system being subdivided into a number of time slots at least equal to the number of peripheral units, the same time slot in each frame being assigned to a peripheral unit, specifically each peripheral unit transferring information about its status, which information is initiated by the peripheral unit itself, to the memory in the control unit during or at least immediately prior to the time slot assigned to the peripheral unit in the next frame.

8 Claims, 1 Drawing Sheet

METHOD OF CONTROLLING IN A QUASI-PARALLEL MODE A PLURALITY OF PERIHERAL UNITS FROM A SINGLE CONTROL UNIT AND A SYSTEM FOR IMPLEMENTING THIS MODE

This is a continuation of application Ser. No. 324,379, filed Mar. 16, 1989, now abandoned.

The invention relates to a method of controlling a plurality of peripheral units from a single control unit, a program being stored in a memory of the control unit and the peripheral units being in a position to communicate with one another and with the central control unit over a common bus in successive frames of a time-division multiplex system.

Such a method is widely known for the communication between a central processing unit (CPU) and a plurality of peripheral units. In this case there is a problem that a peripheral unit frequently needs information from further peripheral units for carrying out the tasks assigned to this peripheral unit, that is to say, for carrying out its program. This problem is generally resolved by repeatedly inquiring after the status of a peripheral unit or a plurality of peripheral units during the execution of a program and in response to the received status information deciding which part of the program can be executed by a peripheral unit without the lack of essential information from one or more further peripheral units. This principle, however, requires much program space and much time. Needless to observe that it is also possible to provide each peripheral unit with a dedicated processor, but this is costly and thus unsuitable for use on a large scale.

It is an object of the invention to provide a system and method enabling to control a plurality of peripheral units from a single control unit without this being at the expense of program space and program time.

According to the invention a control of the various peripheral units from the control unit is very efficiently obtained over a common bus in a time-division multiplex system in that each frame in the time-division multiplex system is subdivided into a number of time slots at least equal to the number of peripheral units, while a peripheral unit is always assigned the same time slot in each frame, and in that each peripheral unit transfers information about its status, which information is initiated by the peripheral unit itself, to the memory in the control unit during or at least immediately prior to the time slot assigned to the peripheral unit in the next frame.

The number of time slots in a frame is preferably equal to the number of peripheral units whereas also the number of program steps each peripheral unit can perform during a time slot is equal.

According to a further aspect of the invention the status information of the peripheral unit together with a counter signal forms an address for the memory which is designed as a programmable logic array (PLA).

Owing to the measures according to the invention a quasiparallel control of the peripheral units is obtained because during each frame a time slot is available for each peripheral unit which time slot is preferably of equal duration for each peripheral unit. Consequently, a plurality of peripheral units can be controlled from no more than a single control unit over no more than a single bus by means of a single program. In order to guarantee a proper execution of the tasks to be performed by the various peripheral units, it is necessary to know in which phase of the program each peripheral units is at the moment when the control unit triggers the next peripheral unit during the next time slot. For this purpose, according to the invention, the status information of the peripheral units is used as a part of the address for the memory of the central control unit during a time slot or at any rate before the beginning of the next time slot, so that this status need not be inquired as is done in prior art systems.

The invention likewise provides a method of controlling a plurality of peripheral units from a single control unit in which a program is stored in a memory of the single control unit and the peripheral units are able to communicate with one another and with the central control unit over a common bus in successive frames in a time-division multiplex system.

The invention will be further explained hereinbelow with the aid of an embodiment of the invention with reference to the drawing Figures in which.

Figure 1:
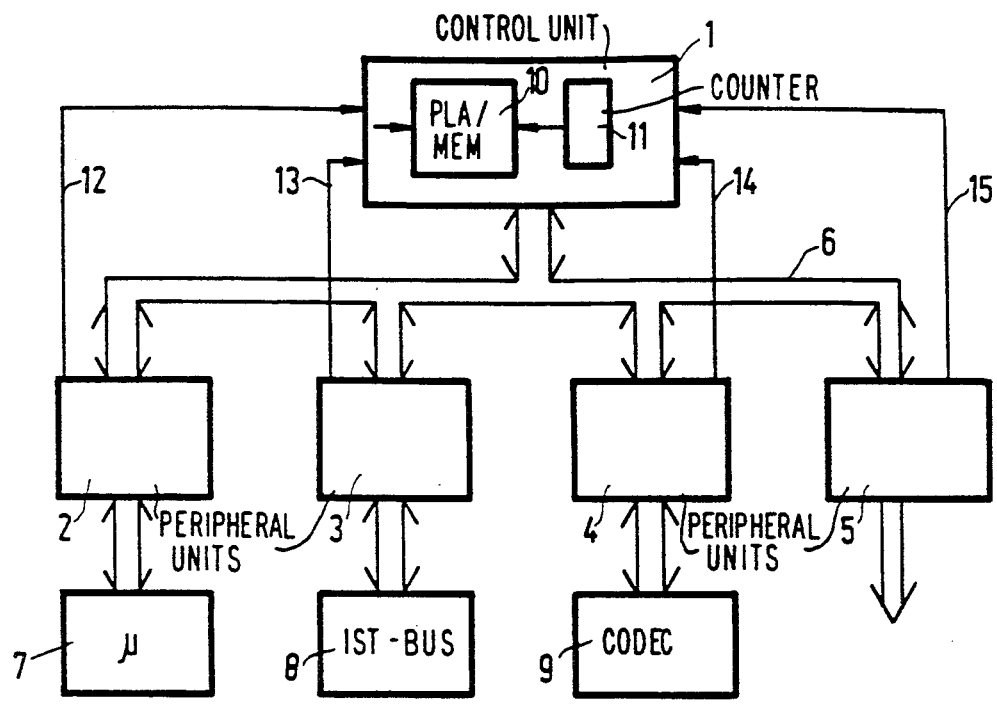
FIG. 1 shows a block diagram of a system in which the invention can be used.

FIG. 1 schematically shows a data processing system comprising a control unit 1, four peripheral units 2, 3, 4 and 5 respectively, which are connected to the unit 1 over a bus 6. Via a bidirectional bus each of the peripheral units 2, 3 and 4 is connected to a dedicated peripheral device, such as a microcomputer 7, an integrated services bus (IST-bus) 8 and a coding/decoding circuit (codec) 9. The fourth peripheral unit forms the link to the 64 kbit/s D-channel for data transmission in accordance with the ISDN principle.

The system shown in FIG. 1 is basically intended to be used as a local area network (LAN) for both voice and data traffic. The IST-bus 8 is used for the purpose of communication between the various units to be possibly incorporated in an ISDN-like system, such as a telephone, a microcomputer or an alarm, each one of these units being connected to the IST-bus via the LAN shown in FIG. 1. For a further explanation of the principle of the IST-bus reference is made to the U.S. Pat. No. 4,672,606.

In an ISDN system all data transport is effected synchronously at a frequency of 8 KHz. The IST-bus also operates synchronously at 8 KHz. This implies that in a frame, time slots of 125 microseconds are available for data transport.

According to the invention each of these frames is subdivided into a number of portions which is equal to the number of peripheral units connected to the central control unit, in this case 4. In the successive time slot portions of the time-division multiplex frame each of the peripheral units is offered the opportunity to perform an associated part of the program to be executed by the system according to FIG. 1. Despite the fact that the complete program is executed serially, it looks as though the peripheral units each execute part of the program in parallel, owing to the subdivision of the successive frames. This quasi-parallel control of the peripheral units offers the advantage that the program time can be maintained at a minimum level.

It often happens that for executing a program any further a specific peripheral unit requires a data item from another peripheral unit which the latter generates during the execution of its program. Now, if the various peripheral units in the successive time slot portions of the time-division multiplex frame were to execute forthwith their own parts of the program, problems would rapidly arise because a specific data item of a specific peripheral unit would not be available in time for another peripheral unit. This problem specifically arises because a conventional program includes many if-statements, in the case of "if . . . yes" one way of the program being followed and in the case of "if . . . no" the other way. It will be evident that it can never be forecast in advance with successive "if"-statements how many steps a part of a program will include. However, a maximum time can indeed be derived. Naturally, it is possible to provide with the aid of control signals that not all different time slot portions have the same length, so that a peripheral unit which may have to execute a long part of the program is given the space it needs in case the program is executed in the most disadvantageous manner, that is to say, in case it has the largest possible length. However, this requires a complex control for realizing time slot portions of different, variable lengths.

According to a second aspect of the invention the program to be executed by the various peripheral units controlled by the central control unit 1 does not contain "if"-statements but, on the other hand, the status of each peripheral unit is directly used as an input variable for the program stored in the memory 10 of the unit 1. Thereto, this program is not stored, as is usually done, in a ROM or RAM in which the successive program lines are scanned under the control of a counter, but in a programmable logic array (PLA). This PLA receives, in addition to the input signal indicating the status of the peripheral unit, also the control signal from a counter 11. The program in the PLA is organized such that under the control of the counter and in response to the status information either one or the other series of program lines is scanned whereas the status information determines which part of the program is to be executed. In addition, the program is organized such that each peripheral unit during its associated time slot scans 32 program lines, so that synchronism is ensured in the programs between the various peripheral units operating quasi simultaneously. In most cases after these 32 program lines the status of the peripheral unit will change for the duration of the three successive time slot portions which are taken up by the programs of the other peripheral units, during which time slot portions the peripheral unit can perform the tasks indicated by the portion of the scanned program lines, so that the novel status information is available for the PLA prior to the next time slot portion. However, it is equally possible that the status changes during the 32 program lines, so that during a time slot portion a change is made from one part of the program to another part of the program. The status information of the various peripheral units is applied to the PLA 10 in unit 1 over a status information line 12-15 respectively, associated to each peripheral unit. With a program structure according to the invention it may happen, obviously, that a peripheral unit in a specific program step is unable to carry out 32 program statements. In such a case a number of non-functional program lines is to be included for yet bringing the total number of lines to 32.

During each time frame it is thus ensured that each peripheral unit is given the disposal of external data which are necessary for further executing its program, because now the exact number of program steps passed through by each peripheral unit is known in each frame. Since, according to the invention, the status information plus the counter information together form the address for the PLA and no "if" statements need to be incorporated in the program, the program can be curtailed considerably.

Figure 2:
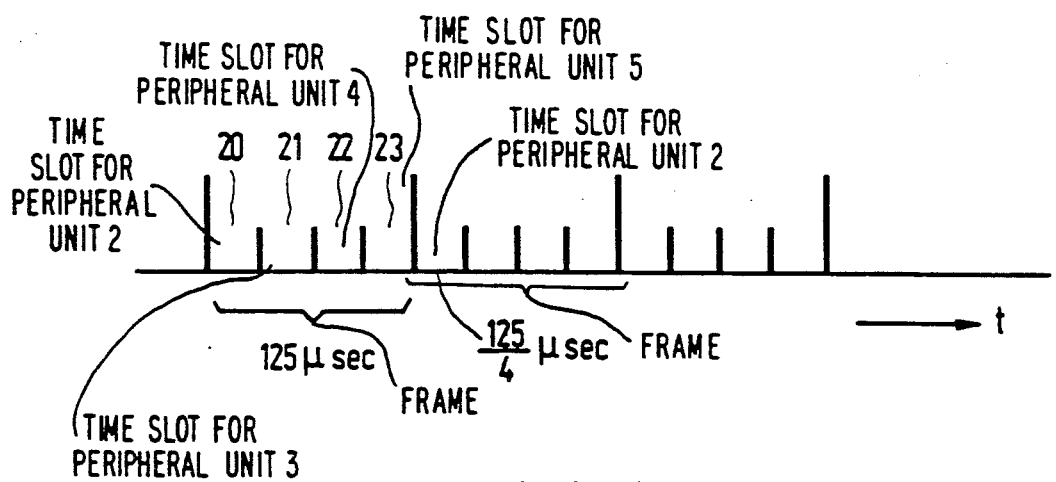
FIG. 2 shows a diagrammatic representation along the time axis of the activities of the various peripheral units during a frame.

FIG. 2 shows by way of illustration a frame of 125 microseconds which is subdivided into time slot portions 20-23, wherein for example in time slot portion 20 the peripheral unit 2 is able to carry out 32 program statements; the peripheral unit 13, 32 program statements in time slot portion 21; etc.

Despite the fact that the invention has been explained hereinbefore with reference to the use in a LAN for an ISDN system, the invention can basically also be used in integrated circuits intended for different purposes.

We claim:

1. A method for controlling a plurality of respective peripheral units from a single control unit having a memory for storing a program, the method comprising the steps of:
    a) communicating between the peripheral units and between the peripheral units and the control unit over a common bus in successive time-division multiplex frames, which time-division multiplex frames are each divided into a number of time slots, which number of time slots is at least as large as a number of the respective peripheral units, each respective one of the peripheral units being assigned a respective one of the time slots within each time-division multiplex frame according to a time slot assignment which does not change from frame to frame;
    b) scanning and/or executing the program lines of the program in the peripheral units according to the time slot assignment, each respective peripheral unit scanning and/or executing an equal number of the program lines during its respective one of the time slots; and
    c) transmitting respective information about a change in status of a respective peripheral unit, from the respective peripheral unit to the memory,
        i) during a present respective one of the time slots assigned to the respective peripheral unit in a present multiplex frame, when the change in status occurs during that respective one of the time slots, or
        ii) immediately prior to the respective one of the time slots assigned to the respective peripheral unit in a next time-division multiplex frame after the change in status.

2. A data processing system comprising:
    a) a bus;
    b) a control unit including a memory for storing a program;
    c) a plurality of respective peripheral units for scanning and/or executing program lines of the program, the respective peripheral units communicating with each other and with the control unit using a plurality of time-division multiplex frames, each of the time division multiplex frames being divided into a number of time slots, the number of time slots being at least as large as a number of the respective peripheral units, each of the respective peripheral units being assigned a respective one of the time slots within each time-division multiplex frame according to a time slot assignment which does not change from frame to frame, each respective peripheral unit scanning and/or executing an equal number of the program lines during its respective one of the time slots; and d) means for transferring information about a status change, in any respective peripheral unit, from the respective peripheral unit to the memory
  i) during a present respective one of the time slots assigned to the respective peripheral unit in a present multiplex frame, when the change of status occurs during that respective one of the time slots, or
  ii) immediately prior to the respective one of the time slots assigned to the respective peripheral unit in a next time-division multiplex frame after the change in status.

3. A system as claimed in claim 2, characterized in that the number of time slots is equal to the number of peripheral units.

4. A system as claimed in claim 3,
A) further comprising a counter, within the control unit, for providing a count; and
B) wherein:
  I) the memory in the control unit is a programmable logic array (PLA); and
  II) the information about the change in status of a peripheral unit includes a number of program lines to be skipped in the PLA as a result of program execution by the respective peripheral unit and which together with the count forms an address of the PLA,
whereby the peripheral units carry out the program without the central unit executing any jump statements and without risking that any peripheral unit starts executing the program lines with insufficient information.

5. A system as claimed in claim 2, characterized in that the equal number of program lines is 32.

6. A system as claimed in claim 5,
A) further comprising a counter, within the control unit, for providing a count; and
B) wherein:
  I) the memory in the control unit is a programmable logic array (PLA); and
  II) the information about the change status of a peripheral unit includes a number of program lines to be skipped in the PLA as a result of program execution by the respective peripheral unit and which together with the count forms an address of the PLA,
whereby the peripheral units carry out the program without the central unit executing any jump statements and without risking that any peripheral unit starts executing the program lines with insufficient information.

7. A system as claimed in claim 2,
A) further comprising a counter, within the control unit, for providing a count; and
B) wherein
  I) the memory in the control unit is a programmable logic array (PLA); and
  II) the information about the change in status of a peripheral unit includes a number of program lines to be skipped in the PLA as a result of program execution by the respective peripheral unit and which together with the count forms an address of the PLA,
whereby the peripheral units carry out the program without the central unit executing any jump statements and without risking that any peripheral unit starts executing the program lines with insufficient information.

8. The system of claim 2 wherein, when a number of program lines to be executed in a peripheral unit is less than the equal number, the peripheral unit makes up the rest of the equal number by scanning non-functional lines.

* * * * *